Oct. 4, 1960 R. A. HAVEMANN 2,954,817
APPARATUS AND METHOD FOR FORMING AND APPLYING STRAND
REINFORCEMENT AND PRODUCT PRODUCED THEREBY
Filed Oct. 11, 1957 4 Sheets-Sheet 2
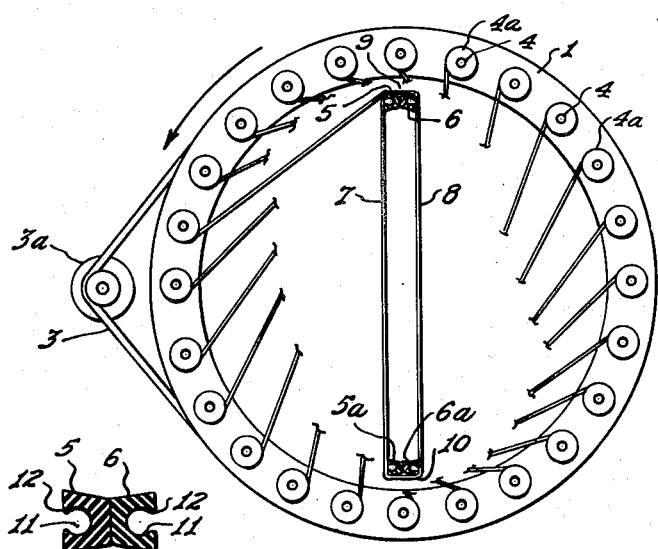
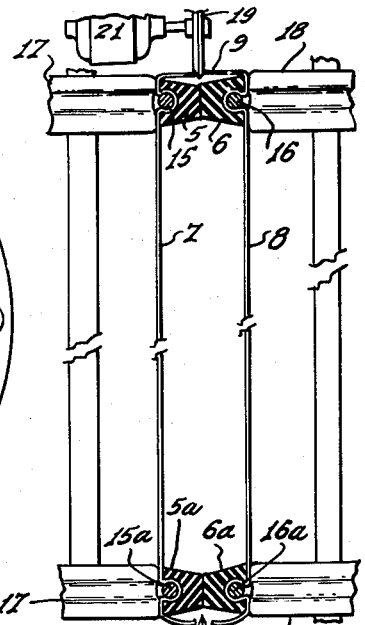
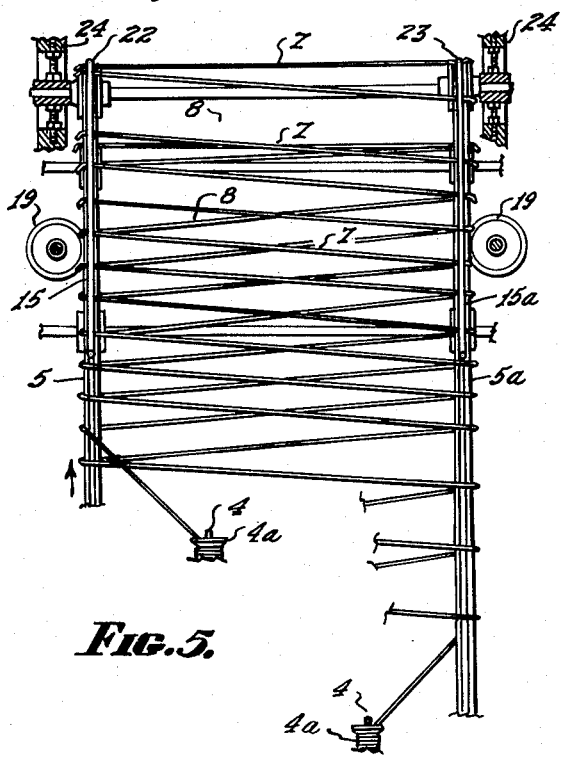
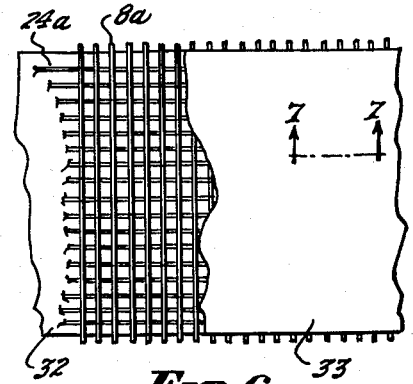
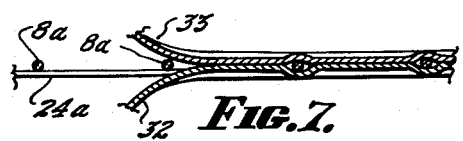
INVENTOR.
ROBERT A. HAVEMANN,
BY
ATTORNEYS.

Oct. 4, 1960   R. A. HAVEMANN   2,954,817
APPARATUS AND METHOD FOR FORMING AND APPLYING STRAND
REINFORCEMENT AND PRODUCT PRODUCED THEREBY
Filed Oct. 11, 1957   4 Sheets-Sheet 3

INVENTOR.
ROBERT A. HAVEMANN,
BY Allen & Allen
ATTORNEYS.

INVENTOR.
ROBERT A. HAVEMANN,
BY Allen & Allen
ATTORNEYS.

United States Patent Office

2,954,817
Patented Oct. 4, 1960

2,954,817

APPARATUS AND METHOD FOR FORMING AND APPLYING STRAND REINFORCEMENT AND PRODUCT PRODUCED THEREBY

Robert A. Havemann, Troy, Ohio, assignor to St. Regis Paper Company, a corporation of New York Filed Oct. 11, 1957, Ser. No. 689,626

22 Claims. (Cl. 154—1.76)

This invention relates to strand reinforcement and more particularly to apparatus and procedures whereby continuous lengths of strand material are formed into unit lengths for application to a sheet or web to be reinforced, or wherein the unit lengths are associated with additional transversely disposed strands to form a mesh or netlike fabric, commonly known as scrim, which may be directly associated with the sheet or web to be reinforced or collected for use at a later time.

The instant invention provides a novel method and apparatus for forming strands of fibers, such as glass fibers, nylon, rayon, and cotton, to name but a few, into linear lengths extending transversely of a moving support or conveyor to which the strands are secured in spaced apart parallel relation, the said moving support serving to convey the strand lengths to one or more stations where longitudinally extending strand reinforcement may be associated with the strand lengths and the assembly so formed bonded together either by means of a bonding medium applied directly to the strands or by means of a bonding medium applied to the sheet or web to which the assembly is juxtaposed and secured.

In my copending application, Robert A. Havemann, Serial No. 562,376, filed January 31, 1956, and entitled Apparatus and Method for Reinforcing Sheet Material there is disclosed a device wherein continuous helical convolutions of strand reinforcement are formed and advanced in a path of travel, each convolution so formed being secured at closely spaced apart points to a pair of belt conveyors, whereupon the convolutions are severed in the areas between the belt conveyors and the conveyors thereafter moved apart to draw the strand lengths so formed into linear condition. The linear strands are then moved by the belt conveyors to a combining station where they are associated with one or more webs of sheet material and, if desired, lengthwise extending reinforcing strands may be associated with the linear strands as the strands pass through the combining station.

In general, the instant invention has for its object the provision of improvements and modifications of the apparatus and procedures taught in the aforementioned copending application, whereby novel forms of scrim may be produced and the operating speed of the device increased so as to materially enhance the output of each operating unit.

A further object of the invention is the provision of apparatus by means of which reinforcing strands may be formed into a scrim and the scrim associated with the material to be reinforced, all in a continuous operation.

A further object of the invention is the provision of apparatus and procedures whereby continuous lengths of strand reinforcement are formed into scrim which may be of either non-woven character or of an interlaced or partially woven character in which certain of the strands are interwoven relative to each other.

Still a further object of the invention is the provision of reinforced sheet material having novel forms of scrim reinforcement which are not truly woven and yet are interlaced so as to provide reinforced sheets which have a much superior tear resistance than sheets reinforced with a non-woven scrim.

Still a further object of the invention is the provision of a conveyor in the form of pairs of spaced apart belts arranged to pass through a spinner on which bobbins of strand reinforcement are mounted, the arrangement of parts being such that the spinner will cause the strand reinforcement to be wrapped about the spaced apart pairs of belts to form elongated helical convolutions. Gripping means in the form of cables engageable in channels in the belts are provided to secure the convolutions to the belts, whereupon the convolutions are severed along their opposite sides to form linear lengths of strand reinforcement, which lengths are then conveyed by the belts to one or more combining stations where additional, oppositely directed strands may be associated with the linear strands and the reinforcing structure associated with one or more webs of material to be reinforced.

The foregoing together with other objects of the invention which will appear hereinafter or which will be apparent to the skilled worker in the art upon reading these specifications, I accomplish by those constructions and arrangements of parts and by those procedures of which I shall now describe certain exemplary embodiments.

Reference is now made to the accompanying drawings wherein:

Figure 2 is an enlarged sectional view of the conveyor belts taken along the line 2—2 of Figure 1.

Figure 3 is a sectional view of a spinner unit taken along the line 3—3 of Figure 1.

Figure 4 is an enlarged fragmentary sectional view of the apparatus taken along the line 4—4 of Figure 1.

Figure 5 is a fragmentary vertical sectional view taken along the irregular line 5—5 of Figure 1 illustrating the manner in which the convolutions of strand reinforcement are formed about the conveyor belts.

Figure 6 is a fragmentary plan view with parts broken away illustrating a reinforced sheet structure formed in accordance with the invention.

Figure 7 is an enlarged fragmentary sectional view taken along the line 7—7 of Figure 6.

Figure 1:
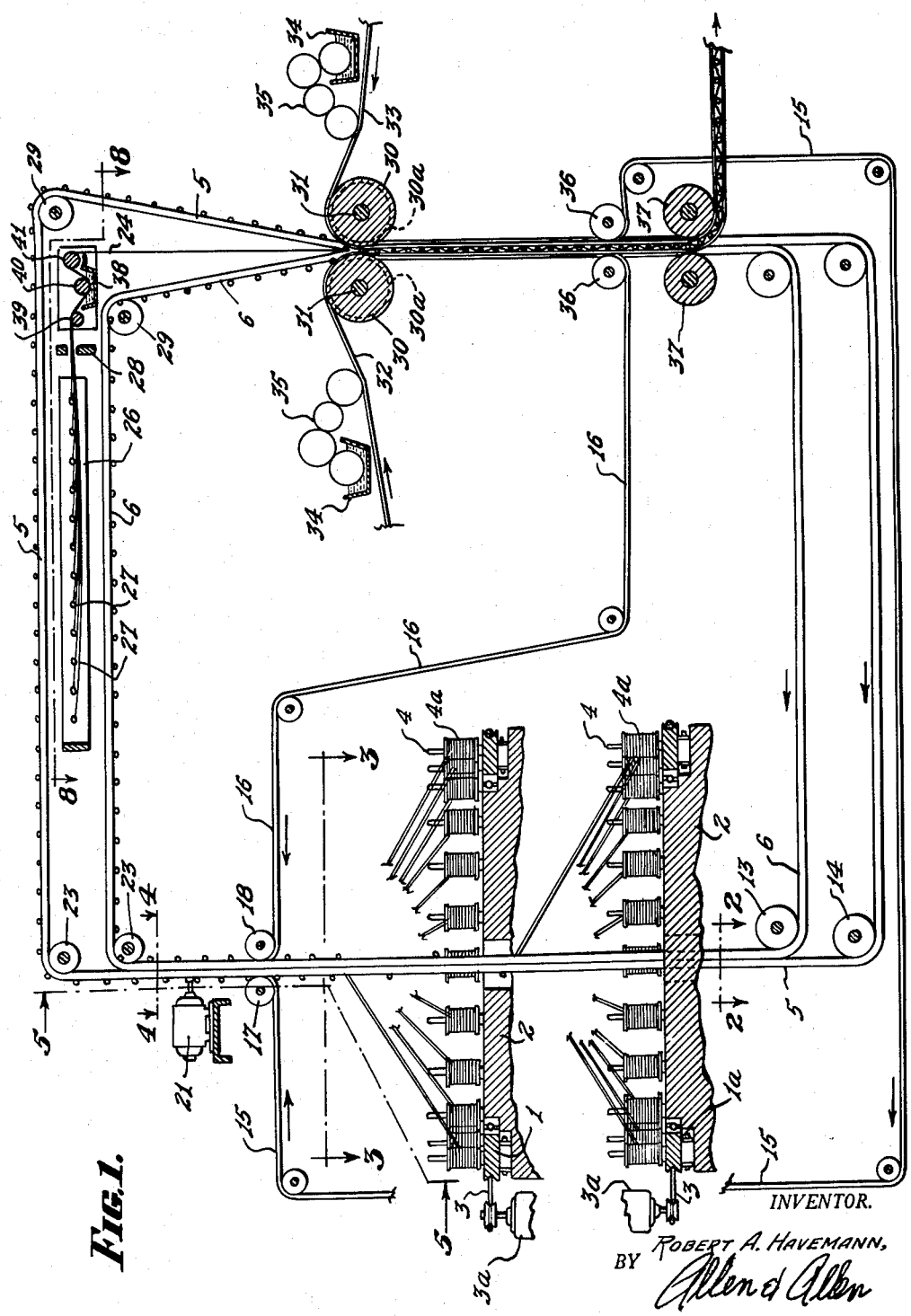
Figure 1 is a vertical sectional diagrammatical view of apparatus in accordance with the invention.

In accordance with the invention, continuous lengths of strand reinforcement are first formed about a moving support into helical convolutions, whereupon the convolutions are severed into unit lengths. To this end, and with reference to Figures 1 and 3 of the drawings, I provide a pair of circular spinning rings 1 and 1a arranged one above the other, the spinning rings each being mounted on a stationary platform 2 and driven by belts 3 from motor units 3a. It will be understood that the drive means illustrated is exemplary only and that various types of drives may be employed, such as the drive means shown in my aforementioned copending application. Preferably each of the spinning units will be independently controlled so that the units may be operated individually. I have found, for example, that in many instances it is desirable to run first one unit and then the other, the first being refilled while the second is in operation. This effects an appreciable savings in "down" time. Of course, in high speed operation or where the strands are to be closely spaced, the spinners will be operated in unison.

Each of the spinning units mounts about its periphery a plurality of spindles 4 upon which are mounted bobbins 4a of strand reinforcement. Extending upwardly through suitable openings in the platforms of the spinning units are spaced pairs of conveyor belts 5, 5a and 6, 6a about which the reinforcing strands are wound to form elongated helical convolutions. As best seen in Figure 3, the belts 5 and 6 extend upwardly on one side of the spinner, whereas the opposed belts 5a and 6a extend upwardly at the opposite side of the spinners so that, as the strands are wound around the belts, the elongated convolutions will be formed, each convolution in effect forming linear lengths 7 and 8 joined together at their ends by connecting portions 9 and 10.

As best seen in Figures 2 and 4, each of the conveyor belts has a cable receiving channel 11 opening outwardly toward the face of the belt, the channels each terminating in a narrow resilient neck 12. The belts 5, 6 and 5a, 6a are arranged in back-to-back relation with their channels opening outwardly in opposite directions. As in the case of the spinning units, the belts will be driven in unison and, preferably, they may be driven from the same source of power as the spinning units with their speed of travel correlated to the speed of rotation of the spinning units. In this way, the application of the strand reinforcements may be maintained substantially uniform during both the starting up and slowing down of the apparatus.

Referring again to Figure 1, the pairs of belts are moved upwardly through the spinning units, having first passed around spaced apart pairs of sheaves 13 and 14, followed by the formation of the helical convolutions about the belts. The convolutions travel upwardly with the belts in spaced apart relation, the spacing of the convolutions being dependent upon the speed of rotation of the spinning units and the lineal speed of the belts.

As the belts and convolutions move upwardly beyond the spinning units, the belts are contacted by cables 15, 15a and 16, 16a which are engaged in the channels 11 as the cables pass around the grooved rolls 17 and 18 (Figure 4) thereby securely clamping the linear lengths 7 and 8 of each convolution between the pairs of belts 5, 5a and 6, 6a in the manner illustrated in Figure 4. To this end, it will be understood that the belts will be formed from a resilient material, such as rubber, so that neck portions 12 will flex as the cables are inserted and, once the cables are inserted, the neck portions will exert a gripping action sufficient to maintain the cables in tight engagement in the channels until positive force is applied to remove them. Preferably, the cables will be formed from braided steel strands which are encased in a plastic jacket or the like which provides a smooth exterior surface easily engageable in the channels and at the same time protects the reinforcing strands from possible damage by reason of their contact with the metal braids of the cable.

After the convolutions have been securely engaged by the belts, the connecting portions 9 and 10 extending around the outermost surfaces of the belts 5, 6 and 5a, 6a are severed by means of cutters 19 and 20 which may take the form of cutting discs rotated by means of motor units 21. The severance of the connecting portions 9 and 10 serves to separate the opposed linear lengths 7 and 8 and, following the severance of the convolutions, the pairs of belts 5, 5a and 6, 6a may be separated to provide separate flights each composed of substantially equally spaced apart linear strands extending in parallel relation.

As will be evident from Figure 5, the strand lengths 7 and 8 will be inclined in opposite directions with respect to each other by reason of the spinning movement of the strands about the continuously moving support. If juxtaposed in their positions of formation, the opposed linear strand lengths 7 and 8 will criss-cross each other in a generally diamond-shaped pattern. The strand lengths secured to each pair of belts may be readily brought into true parallel relation by passing them over sets of adjustable pulleys 22 and 23, it being understood that a separate set of pulleys or sheaves will be provided for each pair of belts. The sheaves 22 and 23 are individually adjustable, as by adjustment means 24 (Figure 5), so that one of the sheaves may be displaced vertically relative to the other so as to effectively increase the path of travel of one of the belts in each pair to compensate for the initially slantwise condition of the strand lengths carried by such pair of belts. For example, and with reference to Figure 5, it will be noted that the strand lengths 7 slant downwardly from left to right. By elevating the sheave 22 so as to effectively lengthen the distance traveled by the belt 5, the forward movement of the end of the strands secured to belt 5 will be effectively retarded so that the opposite ends of each strand length will pass over the tops of their respective sheaves 22 and 23 simultaneously and the belts will thereafter advance in their new direction of movement with the strand lengths disposed at right angles to the direction of movement. It will be apparent from the foregoing that as to the pair of belts 6 and 6a, the adjustment will be in the opposite direction with the sheave 23 raised relative to the sheave 22.

Alternatively, where a diamond pattern is desired, the strands may be retained in their original slantwise positions, or, by adjusting the sheaves 22 and 23 in the opposite direction from that required to align the strands, the angle or slant of the strands will be increased, thereby producing a more pronounced diamond pattern. However, if the angle of inclination of the strands is to be materially increased, the pairs of belts should be moved closer together to compensate for the additional length of the diagonally disposed strands.

Figure 8:
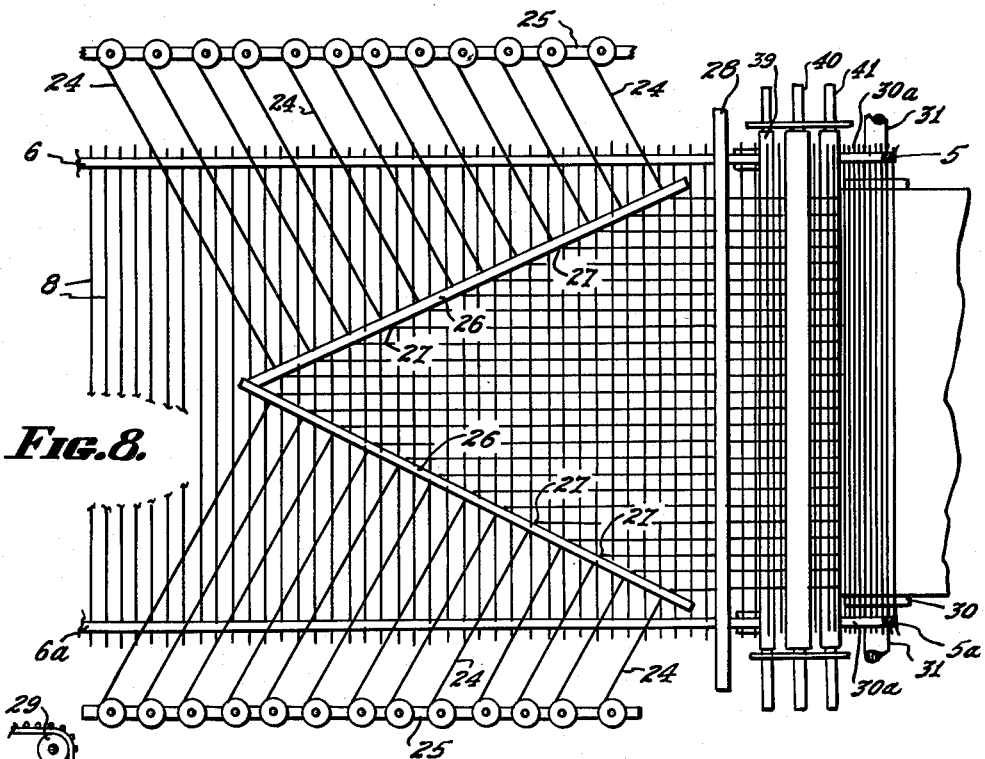
Figure 8 is a fragmentary sectional view taken along the irregular line 8—8 of Figure 1.

Subsequent to their passage about the pairs of sheaves 22, 23, the pairs of belts and the strand lengths secured thereto are advanced to a combining station at which the strand lengths may be associated as such with one or more sheets of material to be reinforced, or the strand lengths, prior to their association with the material to be reinforced are first associated with longitudinal strand reinforcement to form a scrim which may be of either non-woven or uni-directional woven character. In Figures 1 and 8 of the drawings, I have illustrated a form of my invention wherein lengthwise or longitudinal reinforcing strands are interposed between the strand lengths 7 and 8, whereupon the strand lengths are brought together in interdigitating relation to form what may be called a uni-directional woven scrim.

The longitudinal strands 24 are fed from creel 25 (Figure 8) lying to each side of the spaced apart pairs of belts 5, 5a and 6, 6a. Diagonally disposed guide bars 26 are interposed between the pairs of belts and the longitudinal strands 24 are fed from the creels through spaced apart eyelets 27 in the diagonal guide bars. A transverse guide bar 28 receives the strands from the diagonal guide bars and serves to accurately align the longitudinal strands relative to each other and relative to the transversely disposed strand lengths 7 and 8.

After the pairs of belts pass around the pairs of sheaves 29 (Figure 1) lying beyond the guide bars, they are caused to converge and pass between a set of combining rolls which serve the dual function of juxtaposing the reinforcement to the surfaces of one or more sheets of material to be reinforced. As disclosed in my aforementioned copending application, the combining rolls 30 are of a length slightly less than the distance between the pairs of belts 5, 5a and 6, 6a so that the belts pass freely beyond the ends of the combining rolls. To this end, pulley wheels or sheaves 30a (Figure 8) may be mounted on the shafts 31 mounting the combining rolls.

Figure 10:
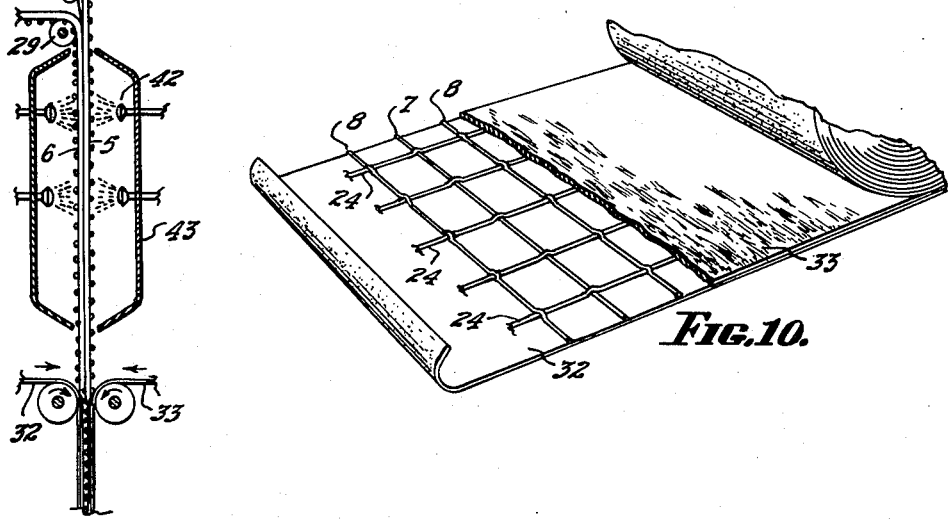
Figure 10 is a fragmentary perspective view with parts broken away illustrating a form of reinforcement having a unidirectional weave.

As the converging pairs of belts approach the combining rolls, it will be understood that their relative positions will be adjusted, as by raising or lowering one of the sets of sheaves 29, so that the strand lengths 7 and 8 will come together with the strand lengths in interdigitating relation and with the longitudinal strands 24 interposed therebetween. This results in alternate strand lengths lying on opposite sides of the longitudinal strands, thereby producing a uni-directional woven effect which can be best seen in Figure 10. As seen therein, the strands 8 overlie the longitudinal strands 24, whereas the strands 7 lie to the underside of the longitudinal strands. As opposed to this, in a conventional non-woven scrim all of the transverse strands would lie to one side of the longitudinal strands. A conventional scrim is illustrated in Figure 6 wherein the longitudinal strands are shown at 24a and the transverse strand lengths at 8a. It will be understood, of course, that non-woven scrim can be readily produced utilizing the instant apparatus, merely by shifting the longitudinal strands 24 to the outside of one of the flights of transverse strands.

The longitudinal and transverse strands may be bonded together either by an adhesive or bonding substance applied to the strands themselves or by means of a bonding adhesive applied to the material being reinforced. For example, where the reinforcing strands are to be sandwiched between two webs of sheet material which are to be bonded together by adhesive, the webs may be fed between the combining rolls 30, one from each side, with one or more layers of laminating adhesive applied to the meeting surfaces of the webs. Thus, as seen in Figure 1, webs of sheet material 32 and 33 may be fed from supply rolls (not shown) over the combining rolls 30 and into their nip. A suitable bonding adhesive may be applied to the inner surface of one or both of the webs, as by means of glue pots 34 and roller applicators 35. Where a single sheet is to be reinforced, the strands may be pressed against one surface of the sheet and embedded in an adhesive coating on the sheet or the strands may be precoated with adhesive and pressed against an uncoated sheet.

Upon passage of the laminated structure beyond the combining rolls, the pairs of conveyor belts will pass between stripper wheels 36 which will serve to strip the cables 15, 15a and 16, 16a from their respective conveyor belts, thereby releasing the ends of the strand lengths 7 and 8 which project beyond the opposite side edges of the webs 32 and 33, as will be evident from Figure 6. The cables are then passed about suitable pulley wheels for return to the spinning section of the apparatus where they are reinserted in the belts as the helical convolutions are being formed. Subsequent to the release of the transverse strand ends, the reinforced material may be led off to a wind-up station, the product passing around rollers 37. Suitable sheaves are provided to return the pairs of belts to a position beneath the spinning units, as will be readily understood.

In the event it is desired to form the scrim as a self-supporting structure, a bonding adhesive may be applied to the strands themselves. Thus, as seen in Figures 1 and 8, an applicator 38 may be positioned beyond the transverse guide bar 28, with the lengthwise strands 24 drawn over a feeder bar 39, then beneath an applicator bar 40 which serves to submerge the strands in the adhesive, the strands passing upon their egress from the applicator over a wiper bar 41. It will be evident that as the coated longitudinal strands and the uncoated transverse strands are brought together by the combining rolls 30, the transverse strands will contact and bond to the coated longitudinal strands.

Figure 9:
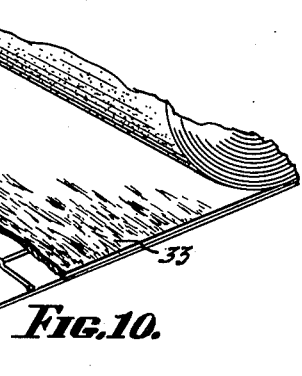
Figure 9 is a diagrammatic vertical sectional view illustrating a spray chamber by means of which the lengthwise and transversely disposed reinforcing strands may be bonded together.

Alternatively, and as diagrammatically illustrated in Figure 9, the longitudinal and transverse strands may be bonded together subsequent to their juxtaposition by means of an adhesive spray 42 contained in a spray chamber 43 through which the strands are passed. It will be understood that the spray chamber will be confined to the strands themselves, and, preferably, the conveying belts will lie to the outside of the spraying chamber. In the event it is desired to collect the scrim as such, i.e., without associating it with one or more webs of material, the chamber 43 may include drying means effective to dry the adhesive so that the scrim may be rolled for subsequent storage and use.

Figure 11:
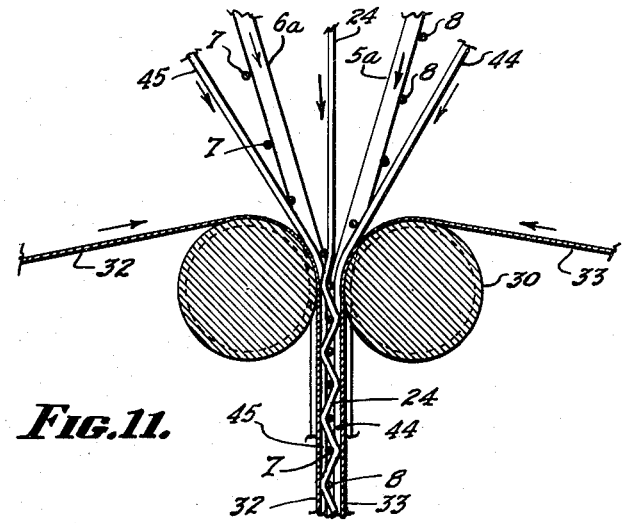
Figure 11 is an enlarged fragmentary view showing the feeding of longitudinal strands to the combining rolls from a plurality of sources.

Referring now to Figure 11 of the drawings, I have therein diagrammatically illustrated a modification of the invention which produced a bi-directional woven effect as opposed to the uni-directional woven effect produced wherein the longitudinal strands 24 are interposed between the flights of strand lengths 7 and 8. In this instance additional sets of longitudinal strands 44 and 45 are introduced to the outside of the strand lengths 7 and 8, the additional sets of longitudinal strands being interspaced relative to the longitudinal strands 24 and to each other. Such arrangement results in a scrim in which the transversely disposed strand lengths are in part interwoven with respect to the longitudinal strands, thereby increasing the strength and resistance to tear of the scrim. While not illustrated, the additional sets of strands will be withdrawn from creels similar to the creels 25 and aligned by one or more guide bars, depending upon the space available.

Figure 12:
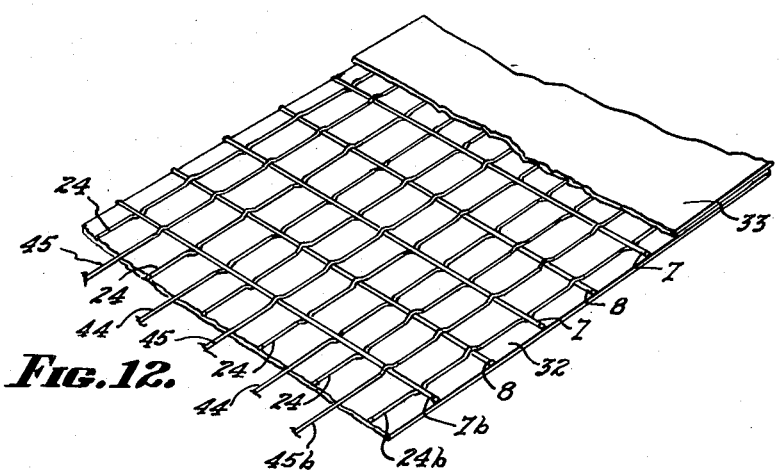
Figure 12 is a fragmentary perspective view of an interwoven reinforcement formed by the method of Figure 11.

Figure 12 illustrates a reinforced product incorporating bi-directional interlaced scrim. As before, the product may comprise juxtaposed lower and upper webs of sheet material 32 and 33 respectively with the scrim interposed therebetween. The strand lengths are shown at 7 and 8, and the longitudinal strands initially interposed between the flights of strand lengths are at 24. The additional sets of longitudinal strands are alternately disposed between adjacent longitudinal strands 24 to provide a pattern in which each transverse strand length is interlaced with respect to two adjacent longitudinal strands. Considering the lowermost corner of Figure 12, it will be seen that transverse strand 7b overlies longitudinal strand 24b but lies beneath the next adjacent longitudinal strand 45b. While certain of the adjacent longitudinal strands lie to the same side of a given transverse strand length, which would not be the case in a conventional woven scrim, the interlacing is nevertheless sufficiently repetitive to greatly enhance the tear resistance of the resultant product.

The particular arrangement of the longitudinal sets of strands in Figure 12 is exemplary only, and it will be readily understood that their position relative to each may be varied. For example, the sequence of adjacent longitudinal strands might comprise strands 44—24—45 in repetitive fashion, or it might comprise strands 44—45—24 in that order, or any one of numerous possible single and multiple combinations. The essential feature is that the scrim has a bi-directional interlace, irrespective of any particular pattern, which approaches the effectiveness of a woven fabric. Yet the scrim is formed without the use of complicated weaving machinery and can be fabricated and applied to the material to be reinforced in a continuous operation.

From the foregoing it should now be apparent that my invention provides an economical and high speed method for forming reinforced sheets. The apparatus is versatile in that it may be utilized to apply the reinforcement in a variety of forms. For example, the reinforcement can be composed entirely of transversely extending strand lengths, longitudinally extending strand lengths, or diagonally disposed strand lengths. Similarly, a diamond pattern can be formed with or without the addition of the longitudinal strands, and either a non-woven scrim or a variety of interlaced forms of scrim can be produced. The scrim may be collected as such for subsequent use or it may be applied directly to the material to be reinforced either as an open-face reinforcement or laminated between juxtaposed webs of either like or dissimilar materials. It will be understood, of course, that neither the nature of the strand reinforcement nor the nature of the materials to which the reinforcement is applied constitute limitations on the invention, and the invention will find application for a wide variety of uses ranging from the manufacture of reinforced tissue products through heavy kraft papers, non-fibrous films, foils and the like. Similarly, the laminating adhesives and the bonding material employed to join together the strands and/or the webs do not constitute limitations on the invention and a wide variety of adhesive materials may be used for the purpose depending, in large measure, on the nature and characteristics of the reinforcing strands and/or the material to be reinforced.

Insofar as the apparatus and method are concerned, the spinning units and belts provide a wide range of operating conditions. Increasing the speed of rotation of the spinning units relative to the speed of travel of the conveyor belts will provide more transverse strands per unit length. By increasing the speed of the belts relative to the spinners, the spacing between adjacent strand lengths will be increased as will their angle of inclination. The spinning units may be used jointly or singly depending upon the number of transverse strands required and the speed of operation. Even where but a single spinner is required, the second unit permits alternate use thereby materially reducing the "down" time of the apparatus.

Modifications may be made without departing from the spirit of my invention. Having, however, disclosed my invention in certain exemplary embodiments, what I desire to secure and protect by Letters Patent is:

1. In apparatus for forming and handling strand reinforcement, means for forming continuous lengths of strand reinforcement into continuous helical convolutions, conveying means for receiving and supporting the helical convolutions as they are formed, clamping means traveling with said conveying means for releasably securing said helical convolutions to said conveying means at pairs of spaced apart points, means for severing each convolution in areas beyond said pairs of spaced apart points so as to divide each such convolution into at least two unit lengths of strand reinforcement secured to said conveying means by said clamping means, and means for disengaging said clamping means to release said unit lengths from said conveying means upon delivery of said unit lengths to a combining station.

2. In apparatus for forming and handling strand reinforcement, spinning means for forming continuous lengths of strand reinforcement into continuous helical convolutions, continuously moving means for receiving and supporting the helical convolutions as they are formed and for moving them in a path of travel, clamping means traveling with said moving means for releasably securing each helical convolution to said moving means at pairs of spaced apart points, means for severing each convolution beyond said pairs of spaced apart points so as to divide each convolution into a plurality of strand lengths secured to said moving means, a combining station in the path of travel of said moving means, and means for disengaging said clamping means to release said strand lengths from said moving means upon passage of said strand lengths through said combining station.

3. In apparatus for forming and handling strand reinforcement, spinning means for forming continuous lengths of strand reinforcement into continuous helical convolutions, continuously moving multiple flight conveyor means for receiving and supporting the helical convolutions as they are formed and for moving them in a path of travel, clamping means coacting with said conveyor means for releasably securing spaced apart portions of each helical convolution to each flight of said conveyor means, means for severing each convolution in areas between said conveyor flights so as to divide each such convolution into a plurality of strand lengths each secured to a flight of said conveyor means, and means for disengaging said clamping means to release said strand lengths from the flights of said conveyor means upon passage through a combining station.

4. In apparatus for reinforcing sheet material, pairs of spaced apart conveyor belts moving in side-by-side paths of travel, means for forming continuous lengths of strand reinforcement into continuous helical convolutions surrounding said pairs of conveyor belts, means for releasably securing each of said helical convolutions to each pair of said conveyor belts, means for severing said convolutions intermediate said pairs of belts so as to divide said convolutions into a plurality of strand lengths each supported by a pair of said conveyor belts, a combining station to which said plurality of strand lengths are delivered by said pairs of belts for association with a sheet of material to be reinforced, and means for releasing said strand lengths from said pairs of belts upon association thereof with said sheet of material.

5. In apparatus for forming and handling strand reinforcement, spaced apart pairs of conveyor belts adapted to move in a path of travel, means for forming continuous lengths of strand reinforcement into elongated helical convolutions surrounding and supported by said pairs of belts, means for releasably securing each helical convolution so formed to said pairs of belts, means for severing each convolution at points lying between said pairs of belts so as to divide the convolutions into strand lengths with each strand length so formed secured to a pair of said belts, a combining station in the path of travel of said pairs of belts, and adjustment means for effectively altering the length of the path of travel of the belts in each pair, whereby the positions of the strand lengths secured to each pair of belts may be varied.

6. The apparatus claimed in claim 5 wherein said strand lengths are transversely disposed, and wherein means are provided in advance of said combining station for juxtaposing continuous lengths of longitudinally extending strand reinforcement to said strand lengths as the strand lengths are advanced.

7. The apparatus claimed in claim 6 wherein said pairs of belts are caused to diverge relative to each other subsequent to the severance of the convolutions into strand lengths, and wherein the means for supplying longitudinally extending strands is positioned to introduce said longitudinal strands intermediate the separated pairs of belts, whereby said longitudinal strands will lie between the strand lengths supported by each of said pairs of belts.

8. The apparatus claimed in claim 7 including means for applying adhesive to said strands to bond them together in the form of an open mesh fabric.

9. The apparatus claimed in claim 8 wherein said last named means comprises applicator means through which said longitudinally extending strands are passed prior to their association with said strand length.

10. The apparatus claimed in claim 8 wherein said adhesive applying means comprises a spraying chamber.

11. A method of forming a reinforced web which comprises forming a continuous length of strand material into helical convolutions, gripping each convolution at pairs of closely spaced apart points on opposite sides of each convolution, severing said convolution between said pairs of spaced apart points to divide each convolution into a plurality of unit lengths, and feeding the unit lengths so formed into contact with the surface of a web of sheet material to be reinforced.

12. The method claimed in claim 11 including the step of bringing said strand lengths into predetermined alignment with respect to said web of sheet material prior to their association with said web.

13. A method of forming a mesh web which comprises spinning continuous lengths of strand material into continuous helical convolutions, gripping each convolution at pairs of spaced apart points on opposite sides of said convolution, severing the convolutions between said pairs of spaced apart points to divide each convolution into a plurality of strand lengths, advancing the strand lengths so formed in a path of travel, feeding additional lengths of strand reinforcement into contact with said strand lengths in angular relation thereto, and bonding together the contacting strand lengths to form an open mesh web.

14. A method of making an open mesh reinforcing fabric which comprises spinning continuous lengths of strand reinforcement into continuous helical convolutions, gripping each convolution at pairs of closely spaced apart points on opposite sides of each convolution, severing each convolution between said pairs of closely spaced apart points to divide each convolution into a plurality of strand lengths, forming the strand lengths into spaced apart layers in which the strands extend laterally of the layers, interposing longitudinally extending strand lengths between the layers so formed, and bringing the layers together, one on each side of said longitudinal strand lengths with the strand lengths of the layers in interdigitating relation, whereby to form a fabric characterized by having the longitudinal strands interlaced relative to the said strand lengths.

15. The method of claim 14 including the step of feeding additional longitudinal strands into contact with the assembly so formed, said additional longitudinal strands lying to the outside of said layers of strand lengths.

16. In apparatus for forming reinforcement, a spinning unit having a rotatable ring mounting a plurality of bobbins, pairs of belts extending through said ring in side-by-side relation with the belts of each pair lying on opposite sides of said ring, said pairs of belts defining a moving conveyor about which strand material from said bobbins is wrapped in continuous helical convolutions upon rotation of said ring, a longitudinal channel extending inwardly from an exposed face of each of said belts, a cable for insertion in each of said channels, and means for inserting said cables in said channels upon passage of said belts through said ring.

17. In apparatus for forming reinforcement, a spinning unit having a rotatable ring mounting a plurality of bobbins, pairs of belts extending through said ring in side-by-side relation with the belts of each pair lying on opposite sides of said ring, said pairs of belts defining a moving conveyor about which strands of material from said bobbins are wrapped in continuous helical convolutions upon rotation of said ring, the belts at each side of said ring lying in back-to-back relation and having longitudinal channels extending inwardly from their outer faces, continuous cables aligned for insertion in said channels, means for inserting said cables in said channels subsequent to the spinning of the helical convolutions of strand material about said pairs of belts, whereby each helical convolution so formed is secured to each of said belts, and cutting means for severing the convolutions of strand material in the areas thereof extending between said pairs of belts.

18. In apparatus for forming reinforcement, a spinning unit having a rotatable ring mounting a plurality of bobbins, pairs of belts extending through said ring in side-by-side relation with the belts of each pair lying on opposite sides of said ring, said pairs of belts defining side-by-side conveyor flights about which strand material from said bobbins is wrapped in continuous helical convolutions upon rotation of said ring, means for securing each of the convolutions so formed to said belts, means for severing said convolutions in areas between said flights so as to divide said convolutions into strand lengths carried by said flights, means for advancing said flights in spaced apart relation, and means for introducing continuous lengths of strand material between said flights, said additional lengths of strand material extending in the direction of travel of said flights, and means for causing said flights to converge so as to cause said strand lengths to approach a common plane with said additional strand material interposed between the said strand lengths.

19. The apparatus claimed in claim 18 including means for varying the paths of travel of said conveyor belts whereby the strand lengths in each of said flights may be brought together in interdigitating relationship.

20. The apparatus claimed in claim 19 including means for applying a bonding material to some at least of said strands, whereby said strands may be bonded together to form an open mesh reinforcing fabric.

21. A method of making a diamond-shaped open mesh reinforcement which comprises spinning continuous lengths of strand reinforcement into continuous helical convolutions, gripping each convolution at pairs of closely spaced apart points on opposite sides of each convolution, severing each convolution between said pairs of closely spaced apart points to divide each convolution into a pair of strand lengths inclined in opposite directions with respect to each other, advancing the strand lengths so formed in a path of travel and bringing the oppositely inclined strand lengths into contacting relations to form a diamond mesh pattern.

22. The method claimed in claim 21 including the step of increasing the angle of inclination between the strand lengths in each convolution as the severed strand lengths are advanced, whereby to alter the shape of the diamond pattern being formed.

References Cited in the file of this patent

UNITED STATES PATENTS

| 1,195,951 | Harrison | Aug. 22, 1916 |
| 2,266,761 | Jackson | Dec. 23, 1941 |

FOREIGN PATENTS

| 440,191 | Great Britain | Dec. 16, 1935 |
| 713,543 | Great Britain | Aug. 11, 1954 |
| 749,914 | Great Britain | June 6, 1956 |